US012106704B2

(12) United States Patent
Feng et al.

(10) Patent No.: US 12,106,704 B2
(45) Date of Patent: Oct. 1, 2024

(54) ELECTRONIC DEVICE

(71) Applicant: Innolux Corporation, Miaoli County (TW)

(72) Inventors: Yu-Hsin Feng, Miaoli County (TW); Yu-Tse Lu, Miaoli County (TW); Ming-Chi Weng, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/187,677

(22) Filed: Mar. 22, 2023

(65) Prior Publication Data

US 2023/0343276 A1 Oct. 26, 2023

Related U.S. Application Data

(60) Provisional application No. 63/334,197, filed on Apr. 25, 2022.

(30) Foreign Application Priority Data

Jan. 3, 2023 (CN) ......................... 202310003134.8

(51) Int. Cl.
*G09G 3/32* (2016.01)
*G09G 3/3266* (2016.01)
*G09G 3/3275* (2016.01)

(52) U.S. Cl.
CPC ............. *G09G 3/32* (2013.01); *G09G 3/3266* (2013.01); *G09G 3/3275* (2013.01); *G09G 2300/0426* (2013.01); *G09G 2310/0221* (2013.01); *G09G 2310/08* (2013.01)

(58) Field of Classification Search
CPC ...... G09G 3/32; G09G 3/3266; G09G 3/3275; G09G 2300/0426; G09G 2310/08; G09G 2310/0221
USPC .......................................................... 345/76
See application file for complete search history.

(56) References Cited

U.S. PATENT DOCUMENTS

| | | | | |
|---|---|---|---|---|
| 2005/0046619 | A1* | 3/2005 | Senda | G09G 3/3283 345/76 |
| 2006/0077137 | A1* | 4/2006 | Kwon | G09G 3/3283 345/76 |
| 2017/0343868 | A1* | 11/2017 | Kim | G02F 1/1368 |
| 2018/0174523 | A1* | 6/2018 | Jeon | H10K 59/131 |
| 2020/0035167 | A1* | 1/2020 | Lee | G09G 3/3275 |
| 2020/0209673 | A1* | 7/2020 | Lee | G09G 3/3225 |
| 2020/0312229 | A1* | 10/2020 | Kim | G09G 3/32 |
| 2020/0394953 | A1* | 12/2020 | Kim | H05B 45/33 |
| 2022/0084449 | A1* | 3/2022 | Son | H01L 33/502 |
| 2022/0366828 | A1* | 11/2022 | Park | G09G 3/2003 |
| 2023/0005987 | A1* | 1/2023 | Kang | H01L 33/62 |
| 2023/0126436 | A1* | 4/2023 | Bai | H10K 59/1216 345/204 |
| 2023/0223504 | A1* | 7/2023 | Moon | H10K 59/12 257/88 |

* cited by examiner

*Primary Examiner* — Tom V Sheng
(74) *Attorney, Agent, or Firm* — JCIPRNET

(57) ABSTRACT

An electronic device is provided. The electronic device includes an integrated driver board and at least one semiconductor unit substrate. The integrated driver board includes a circuit board, a data drive circuit, and a scanning drive circuit. The data drive circuit and the scanning drive circuit are disposed on the circuit board. The at least one semiconductor unit substrate is coupled to the data drive circuit and the scanning drive circuit.

18 Claims, 7 Drawing Sheets

ELECTRONIC DEVICE

CROSS-REFERENCE TO RELATED APPLICATION

This application claims the priority benefits of U.S. provisional application Ser. No. 63/334,197, filed on Apr. 25, 2022 and China application serial no. 202310003134.8, filed on Jan. 3, 2023. The entirety of each of the above-mentioned patent applications is hereby incorporated by reference herein and made a part of this specification.

TECHNICAL FIELD

The disclosure relates to an electronic device, and in particular to an electronic device including at least one semiconductor unit substrate.

DESCRIPTION OF RELATED ART

Generally, an electronic device (such as a display device, an antenna array device) includes a drive circuit and a plurality of semiconductor units. The drive circuit is capable of driving the plurality of semiconductor units. The existing drive circuit and the plurality of semiconductor units may be disposed at the same semiconductor unit substrate. However, the drive circuit occupies the layout area of the substrate. Therefore, the layout area of the plurality of semiconductor units on the semiconductor unit substrate is limited.

SUMMARY

The disclosure is directed to an electronic device capable of increasing the layout area of a plurality of semiconductor units on a semiconductor unit substrate.

According to an embodiment of the disclosure, an electronic device includes an integrated driver board and at least one semiconductor unit substrate. The integrated driver board includes a circuit board, a data drive circuit, and a scanning drive circuit. The data drive circuit and the scanning drive circuit are disposed on the circuit board. The at least one semiconductor unit substrate is coupled to the data drive circuit and the scanning drive circuit.

Based on the above, the electronic device includes the integrated driver board and the at least one semiconductor unit substrate. The data drive circuit and the scanning drive circuit are respectively disposed on the circuit board of the integrated driver board. Therefore, the data drive circuit and the scanning drive circuit are not disposed on the at least one semiconductor unit substrate. In this way, the layout area of the semiconductor unit on the at least one semiconductor unit substrate is not occupied by the data drive circuit and the scanning drive circuit.

DESCRIPTION OF THE EMBODIMENTS

Figure 1:
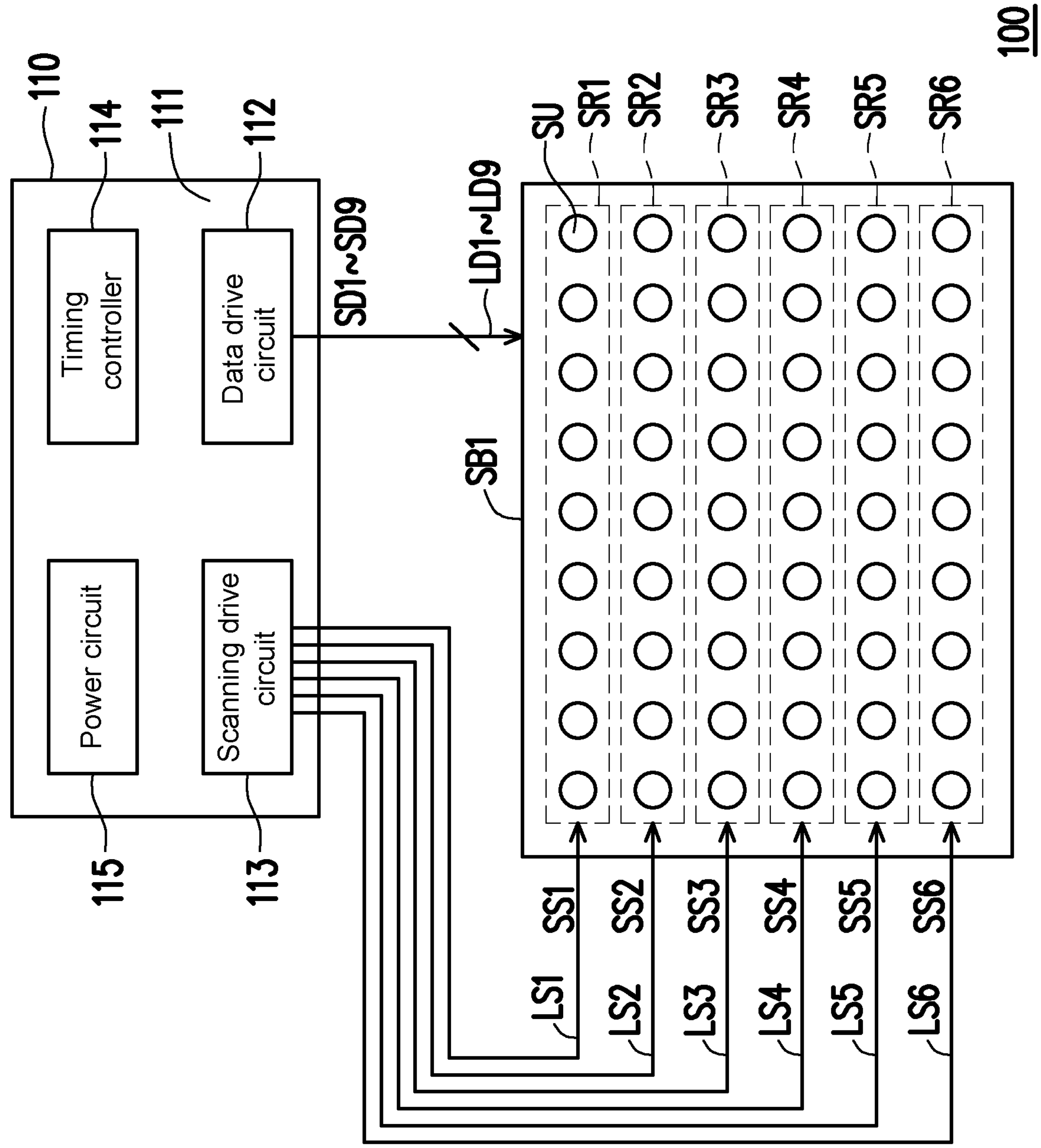
FIG. 1 is a schematic diagram of an electronic device shown according to the first embodiment of the disclosure.

The disclosure may be understood by referring to the following detailed description taken in conjunction with the accompanying drawings as described below. It should be noted that, for purposes of clarity and easy understanding by readers, each drawing of the disclosure depicts a portion of an electronic device, and some elements in each drawing may not be drawn to scale. In addition, the number and size of each device depicted in the drawings are illustrative and not intended to limit the scope of the disclosure.

Certain terms are used throughout the description and the following claims to refer to specific elements. As will be understood by those skilled in the art, manufacturers of electronic equipment may refer to elements by different names. This document does not intend to distinguish between elements that differ in name but not function. In the following description and in the claims, the terms "containing", "including", and "having" are used in an open-ended manner, and should therefore be construed to mean "containing but not limited to . . . " Accordingly, when the terms "containing", "including", and/or "having" are used in the description of the disclosure, it will be indicated that there are corresponding features, regions, steps, operations, and/or elements, but not limited to there being one or a plurality of corresponding features, regions, steps, operations, and/or components.

It should be understood that, when an element is referred to as being "coupled to", "connected to", or "conducted to" another element, the element may be directly connected to another element and an electrical connection may be established directly, or there may be an intermediate element between these elements for relaying an electrical connection (indirect electrical connection). In contrast, when an element is referred to as being "directly coupled to," "directly connected to", or "directly connected to" another element, there are no intervening members present.

Although terms such as first, second, third, etc. may be used to describe various constituent elements, such constituent elements are not limited by these terms. The terms are used to distinguish a constituent element from other constituent elements in the specification. The claims may not use the same terms, but may use the terms first, second, third etc. with respect to the required order of the elements. Therefore, in the following description, a first constituent element may be a second constituent element in the claims.

An electronic device of the disclosure may include a display device, an antenna device, a sensing device, a light-emitting device, a touch display, a curved display, a free shape display, a tiling device, or a packaging device, but the disclosure is not limited thereto. The electronic device may include a bendable or flexible electronic device. The electronic device may include, for example, liquid crystal, light-emitting diode, quantum dot (QD), fluorescence, phosphor, other suitable display media, or a combination of the above materials, but the disclosure is not limited thereto. The light-emitting diode may include, for example, an organic light-emitting diode (OLED), a mini LED, a micro LED, or a quantum dot LED (may include QLED or QDLED), or other suitable materials, or a combination of the above, but the disclosure is not limited thereto. The packaging device may be suitable for a wafer-level packaging (WLP) technique or a panel-level packaging (WLP) technique, such as a packaging device of a chip-first process or an RDL-first process. The display device may include, for example, a tiling display device and a tiling backlight device, but the disclosure is not limited thereto. The antenna device may be, for example, a liquid-crystal antenna, but the disclosure is not limited thereto. The antenna device may include, for example, an antenna tiling device, but the disclosure is not limited thereto. It should be noted that the electronic device may be any arrangement and combination of the above, but the disclosure is not limited thereto. In addition, the shape of the electronic device may be rectangular, circular, polygonal, a shape having curved edges, or other suitable shapes. The electronic device may have a peripheral system such as a driving system, a control system, a light source system, etc. to support a display device, an antenna device, or a tiling device, but the disclosure is not limited thereto. The sensing device may include a camera, an infrared sensor, or a fingerprint sensor, etc., and the disclosure is not limited thereto. In some embodiments, the sensing device may further include a flashlight, an infrared (IR) light source, other sensors, electronic elements, or a combination thereof, but the disclosure is not limited thereto.

In the disclosure, the embodiments use “pixel” or “pixel unit” as a unit for describing a specific area including at least one functional circuit for at least one specific function. The area of a “pixel” depends on the unit used to provide a particular function, and adjacent pixels may share the same portions or conductive lines, but may also contain specific portions of themselves. For example, adjacent pixels may share the same channel or the same data line, but a pixel may also have its own transistor or capacitor.

It should be noted that technical features in different embodiments described below may be replaced, reorganized, or mixed with each other to form another embodiment without departing from the spirit of the disclosure.

Please refer to FIG. 1. FIG. 1 is a schematic diagram of an electronic device shown according to the first embodiment of the disclosure. In the present embodiment, an electronic device 100 includes an integrated driver board 110 and a semiconductor unit substrate SB1. The integrated driver board 110 includes a circuit board 111, a data drive circuit 112, and a scanning drive circuit 113. The data drive circuit 112 and the scanning drive circuit 113 are disposed on the circuit board 111. The semiconductor unit substrate SB1 is coupled to the data drive circuit 112 and the scanning drive circuit 113. The semiconductor unit substrate SB1 includes a plurality of semiconductor units SU. In the present embodiment, the semiconductor units SU may be any type of pixel unit, photodiode, antenna diode (such as a varactor, etc.), packaging unit (such as a chip, etc.), or any type of light-emitting element. The scanning drive circuit 113 may be a gate drive circuit or a shift register circuit.

It should be mentioned that, the data drive circuit 112 and the scanning drive circuit 113 are respectively disposed on the circuit board 111 of the integrated driver board 110 instead of being disposed on the semiconductor unit substrate SB1. Therefore, the data drive circuit 112 and the scanning drive circuit 113 are omitted on the semiconductor unit substrate SB1. In this way, the layout area of the plurality of semiconductor units SU on the semiconductor unit substrate SB1 is not occupied by the data drive circuit 112 and the scanning drive circuit 113. With a fixed layout area of the semiconductor unit substrate SB1, the semiconductor unit substrate SB1 may accommodate more semiconductor units SU. Under the condition that the number of semiconductor units SU is fixed, the area of the semiconductor unit substrate SB1 may be moderately reduced.

In the present embodiment, the data drive circuit 112 is connected to the plurality of semiconductor units SU via channels LD1 to LD9. The data drive circuit 112 simultaneously provides data signals SD1 to SD9 to the plurality of semiconductor units SU via the channels LD1 to LD9. For example, the channels LD1 to LD9 are data lines respectively. For example, the data drive circuit 112 provides the data signal SD1 to the first semiconductor unit column in the plurality of semiconductor units SU via the channel LD1. The data drive circuit 112 provides the data signal SD2 to the second semiconductor unit column in the plurality of semiconductor units SU via the channel LD2, and so on.

In the present embodiment, the scanning drive circuit 113 is connected to the plurality of semiconductor units SU via channels LS1 to LS6. The scanning drive circuit 113 provides scan signals SS1 to SS6 to the plurality of semiconductor units SU via the channels LS1 to LS6. For example, the channels LS1 to LS6 are scan lines respectively. For example, the plurality of semiconductor units SU are grouped into semiconductor unit rows SR1 to SR6. During the first period, the scanning drive circuit 113 provides the scan signal SS1 to the semiconductor unit row SR1 via the channel LS1. During the second period, the scanning drive circuit 113 provides the scan signal SS2 to the semiconductor unit row SR2 via the channel LS2, and so on. Therefore, the semiconductor unit rows SR1 to SR6 respectively receive the data signals SD1 to SD9 based on the timing of one of the scan signals SS1 to SS6.

In addition, the integrated driver board 110 may further include a timing controller 114 and a power circuit 115. The timing controller 114 and the power circuit 115 are disposed on the circuit board 111. The timing controller 114 is coupled to the data drive circuit 112 and the scanning drive circuit 113 via the circuit board 11. The timing controller 114 provides the clock signal needed by the data drive circuit 110 during operation, and provides the clock signal and the initial signal needed by the scan drive circuit 120 during operation. The power circuit 115 provides the driving power needed by the tiling device 100 during operation.

Figure 2:
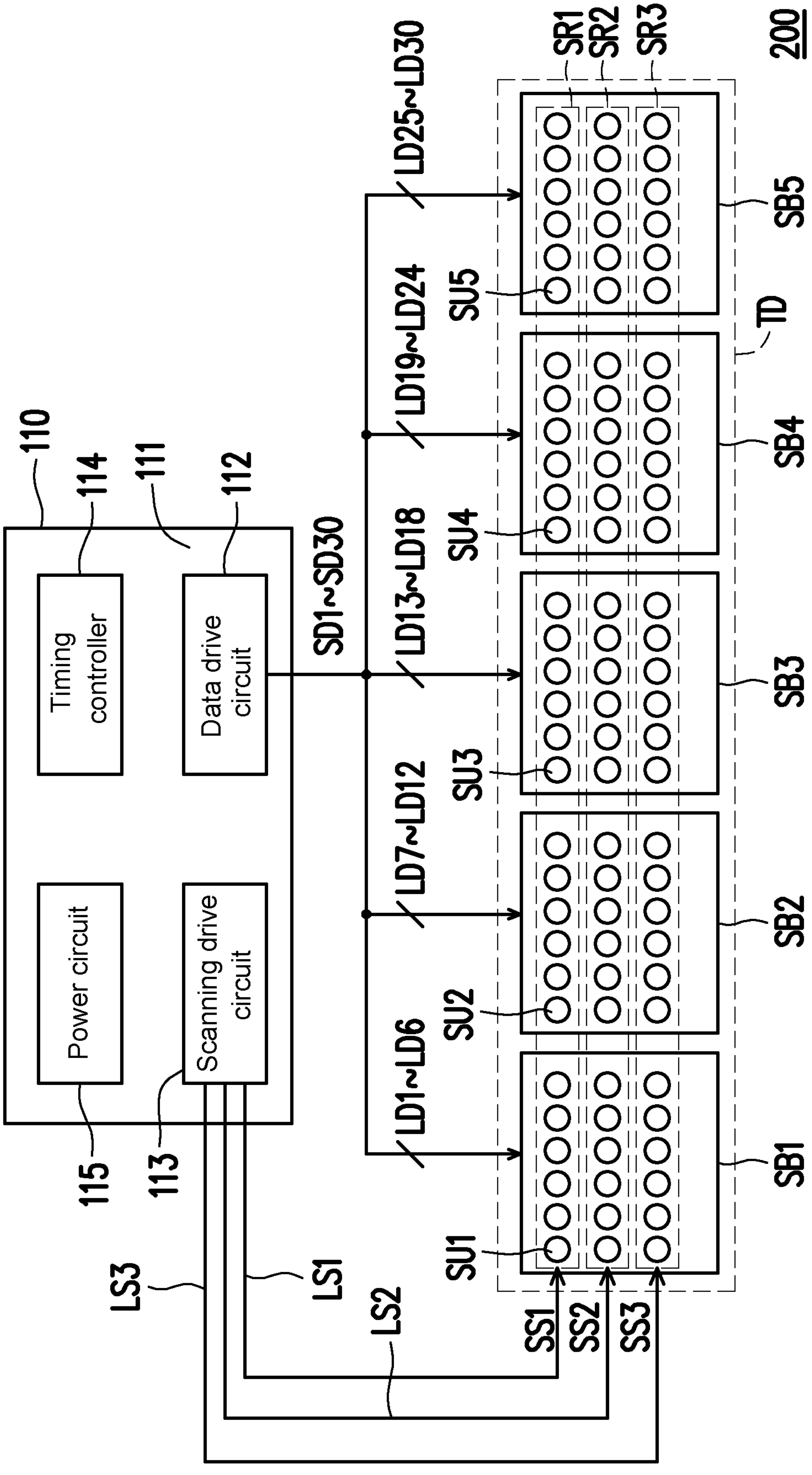
FIG. 2 is a schematic diagram of an electronic device shown according to the second embodiment of the disclosure.

Please refer to FIG. 2. FIG. 2 is a schematic diagram of an electronic device shown according to the second embodiment of the disclosure. In the present embodiment, an electronic device 200 may include the integrated driver board 110 and semiconductor unit substrates SB1 to SB5. The integrated driver board 110 may include the circuit board 111, the data drive circuit 112, the scanning drive circuit 113, the timing controller 114, and the power circuit 115. The data drive circuit 112, the scanning drive circuit 113, the timing controller 114, and the power circuit 115 are disposed on the circuit board 111. The semiconductor unit substrates SB1 to SB5 are coupled to the data drive circuit 112 and the scanning drive circuit 113.

The semiconductor unit substrate SB1 includes a plurality of semiconductor units SU1. The semiconductor unit substrate SB2 includes a plurality of semiconductor units SU2. The semiconductor unit substrate SB3 includes a plurality of semiconductor units SU3. The semiconductor unit substrate SB4 includes a plurality of semiconductor units SU4. The semiconductor unit substrate SB5 includes a plurality of semiconductor units SU5.

In the present embodiment, the semiconductor unit substrates SB1 to SB5 may be tiling substrates respectively. The semiconductor unit substrates SB1 to SB5 are tiled to each other to form a tiling device TD.

It should be noted that at least one of the data drive circuit 112, the scanning drive circuit 113, the timing controller 114, and the power circuit 115 is not disposed on the semiconductor unit substrates SB1 to SB5. The design of the semiconductor unit substrates SB1 to SB5 is significantly simplified. Moreover, the semiconductor unit substrates SB1 to SB5 are shared by a single data drive circuit 112 and a single scanning drive circuit 113. That is to say, the number of data drive circuits 112 and the number of scanning drive circuits 113 are respectively reduced from five to one. The cost of the electronic device 200 may be significantly reduced.

In the present embodiment, the data drive circuit 112 and the scanning drive circuit 113 are respectively coupled to the semiconductor unit substrates SB1 to SB5. The data drive circuit 112 simultaneously outputs data signals SD1 to SD30 to the semiconductor unit substrates SB1 to SB5.

Specifically, the data drive circuit 112 is connected to the plurality of semiconductor units SU1 of the semiconductor unit substrate SB1 via the channels LD1 to LD6. The data drive circuit 112 is connected to the plurality of semiconductor units SU2 of the semiconductor unit substrate SB2 via channels LD7 to LD12. The data drive circuit 112 is connected to the plurality of semiconductor units SU3 of the semiconductor unit substrate SB3 via channels LD13 to LD18. The data drive circuit 112 is connected to the plurality of semiconductor units SU4 of the semiconductor unit substrate SB4 via channels LD19 to LD24. The data drive circuit 112 is connected to the plurality of semiconductor units SU5 of the semiconductor unit substrate SB5 via channels LD25 to LD30. In the present embodiment, the data drive circuit 112 simultaneously outputs the data signals SD1 to SD30 to the semiconductor unit substrates SB1 to SB5 via the channels LD1 to LD30. Therefore, the data drive circuit 112 simultaneously provides the data signals SD1 to SD30 to the corresponding semiconductor unit substrates SB1 to SB5.

In the present embodiment, the scanning drive circuit 113 provides the scan signals SS1 to SS3 with different timings to the semiconductor unit substrates SB1 to SB5. The semiconductor unit substrates SB1 to SB5 may be electrically connected correspondingly via the scan lines. The semiconductor cell row SR1 receives the scan signal SS1 at the same time. The semiconductor cell row SR2 receives the scan signal SS2 at the same time. The semiconductor cell row SR3 receives the scan signal SS3 at the same time. During the first period, the scanning drive circuit 113 simultaneously outputs the scan signal SS1 to the semiconductor unit substrates SB1 to SB5. Therefore, the data signals SD1 to SD30 are received in the semiconductor unit row SR1 in the semiconductor unit substrates SB1 to SB5. During the second period, the scanning drive circuit 113 simultaneously outputs the scan signal SS2 to the semiconductor unit substrates SB1 to SB5. Therefore, the data signals SD1 to SD30 are received in the semiconductor unit row SR2 in the semiconductor unit substrates SB1 to SB5. During the third period, the data signals SD1 to SD30 are received in the semiconductor unit row SR3 in the semiconductor unit substrates SB1 to SB5.

Moreover, the data drive circuit 112, the scanning drive circuit 113, the timing controller 114, and the power circuit 115 are disposed on the circuit board 111. Therefore, the data drive circuit 112, the scanning drive circuit 113, the timing controller 114, and the power circuit 115 are readily detected. Once the tester finds that one of the data drive circuit 112, the scanning drive circuit 113, the timing controller 114, and the power circuit 115 is abnormal, the tester needs to replace the integrated driver board 110.

Taking the present embodiment as an example, the number of channels output from the data drive circuit 112 to the semiconductor unit substrates SB1 to SB5 is six respectively. Therefore, the number of channels output from the data drive circuit 112 to the semiconductor unit substrates SB1 to SB5 is the same as each other. However, the disclosure is not limited to the number of channels. In some embodiments, the number of channels output from the data drive circuit 112 to the semiconductor unit substrates SB1 to SB5 may not be exactly the same.

Taking the present embodiment as an example, the scanning drive circuit 113 is coupled to the semiconductor unit substrates SB1 to SB5 via the channels LS1 to LS3. The number of channels LS1 to LS3 output from the scanning drive circuit 113 to the semiconductor unit substrates SB1 to SB5 is three. Therefore, the number of channels output from the scanning drive circuit 113 to the semiconductor unit substrates SB1 to SB5 is the same as each other.

In the present embodiment, the number of channels output from the data drive circuit 112 to the semiconductor unit substrates SB1 to SB5 is six respectively. The number of channels output from the scanning drive circuit 113 to the semiconductor unit substrates SB1 to SB5 is three. The number of channels output from the data drive circuit 112 to the semiconductor unit substrates SB1 to SB5 is different from the number of channels output from the scanning drive circuit 113 to the semiconductor unit substrates SB1 to SB5. In some embodiments, based on actual design requirements, the number of channels output from the data drive circuit 112 to the semiconductor unit substrates SB1 to SB5 may be the same as the number of channels output from the scanning drive circuit 113 to the semiconductor unit substrates SB1 to SB5.

Figure 3:
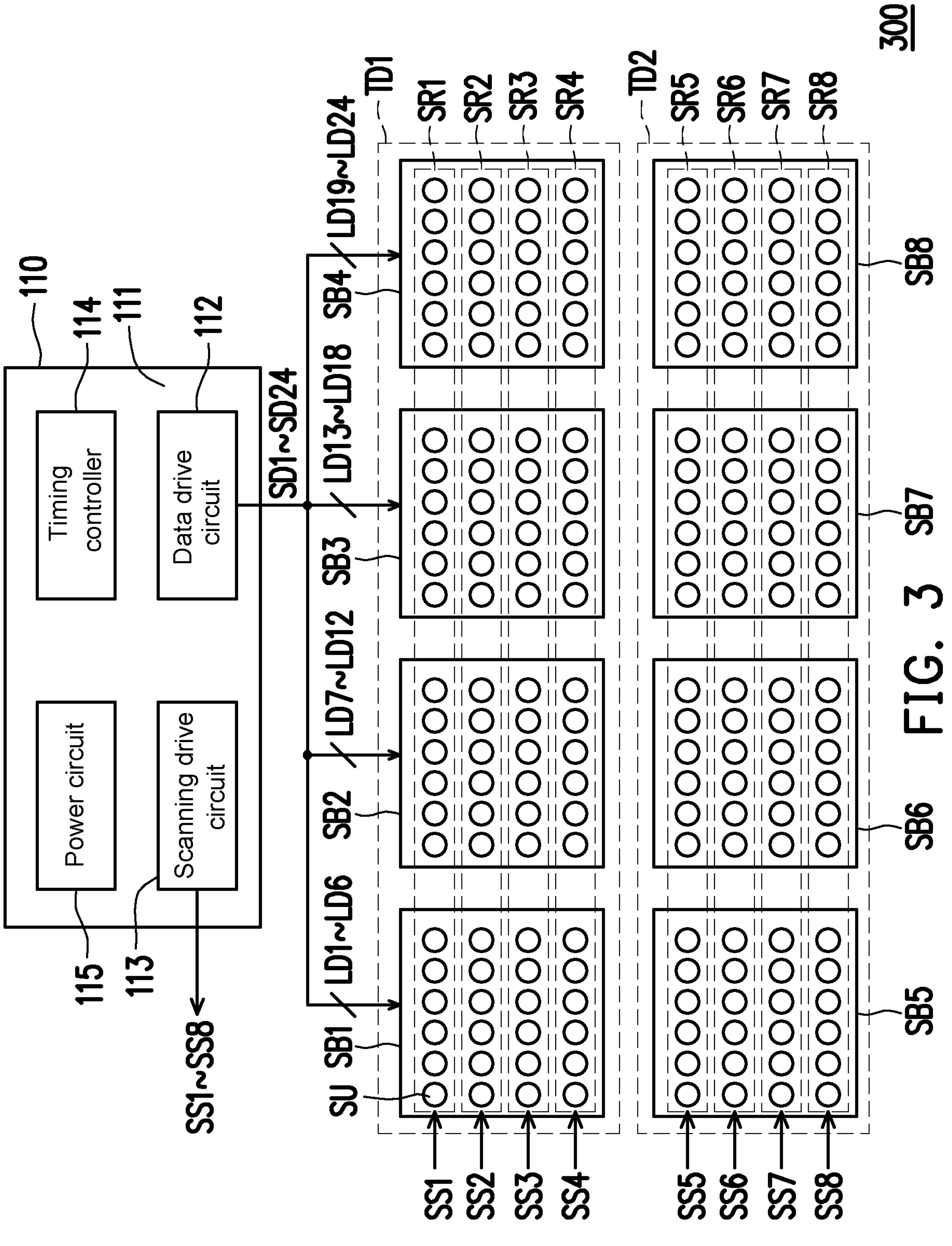
FIG. 3 is a schematic diagram of the first operation of an electronic device shown according to the third embodiment of the disclosure.

Please refer to FIG. 3. FIG. 3 is a schematic diagram of the first operation of an electronic device according to the third embodiment of the disclosure. In the present embodiment, an electronic device 300 may include the integrated driver board 110 and semiconductor unit substrates SB1 to SB8. The integrated driver board 110 includes the circuit board 111, the data drive circuit 112, the scanning drive circuit 113, the timing controller 114, and the power circuit 115. The data drive circuit 112, the scanning drive circuit 113, the timing controller 114, and the power circuit 115 are disposed on the circuit board 111.

In the present embodiment, the semiconductor unit substrates SB1 to SB8 respectively include the plurality of semiconductor units SU. The plurality of semiconductor units SU are divided into semiconductor unit rows SR1 to SR8. The semiconductor unit substrates SB1 to SB8 may be tiling substrates respectively. The semiconductor unit substrates SB1 to SB4 are tiled to each other to form a tiling device TD1. The semiconductor unit substrates SB1 to SB4 may be electrically connected correspondingly via the scan lines. The semiconductor cell row SR1 may receive the scan signal SS1 at the same time. The semiconductor cell row SR2 may receive the scan signal SS2 at the same time, and so on.

The semiconductor unit substrates SB5 to SB8 are tiled to each other to form a tiling device TD2. The semiconductor unit substrates SB5 to SB8 may be electrically connected correspondingly via the scan lines. The semiconductor cell row SR5 may receive the scan signal SS5 at the same time. The semiconductor cell row SR6 may receive the scan signal SS6 at the same time, and so on.

In addition, the tiling devices TD1 and TD2 may be electrically connected correspondingly via the data lines in the semiconductor unit substrates SB1 to SB8. Therefore, the semiconductor unit columns in the tiling devices TD1 and TD2 may respectively receive the same corresponding data signal.

The scanning drive circuit 113 may provide the scan signals SS1 to SS8 with different timings, and scan the semiconductor unit rows SR1 to SR8 of the semiconductor unit substrates SB1 to SB8 row by row using the scan signals SS1 to SS8. The semiconductor unit row SR1 of the semiconductor unit substrates SB1 to SB4 receives data signals SD1 to SD24 in response to the same scan signal SS1 in the first period. The semiconductor unit row SR2 of the semiconductor unit substrates SB1 to SB4 receives the data signals SD1 to SD24 in response to the same scan signal SS2 in the second period. And so forth. The semiconductor unit row SR5 of the semiconductor unit substrates SB5 to SB8 receives the data signals SD1 to SD24 in response to the same scan signal SS5 in the fifth period. The semiconductor unit row SR6 of the semiconductor unit substrates SB1 to SB4 receives the data signals SD1 to SD24 in response to the same scan signal SS6 in the sixth period, and so on.

In the present embodiment, the timing of the scan signal SS1 may be ahead of the timing of the scan signal SS2. The timing of the scan signal SS2 may be ahead of the timing of the scan signal SS3, and so on. However, the timing lead relationship of the scan signals SS1 to SS8 of the disclosure may be replaced. For example, the timing of the scan signal SS1 may be ahead of the timing of the scan signal SS5. The timing of the scan signal SS5 may be ahead of the timing of the scan signal SS2. The timing of the scan signal SS2 may be ahead of the timing of the scan signal SS6, and so on.

Figure 4:
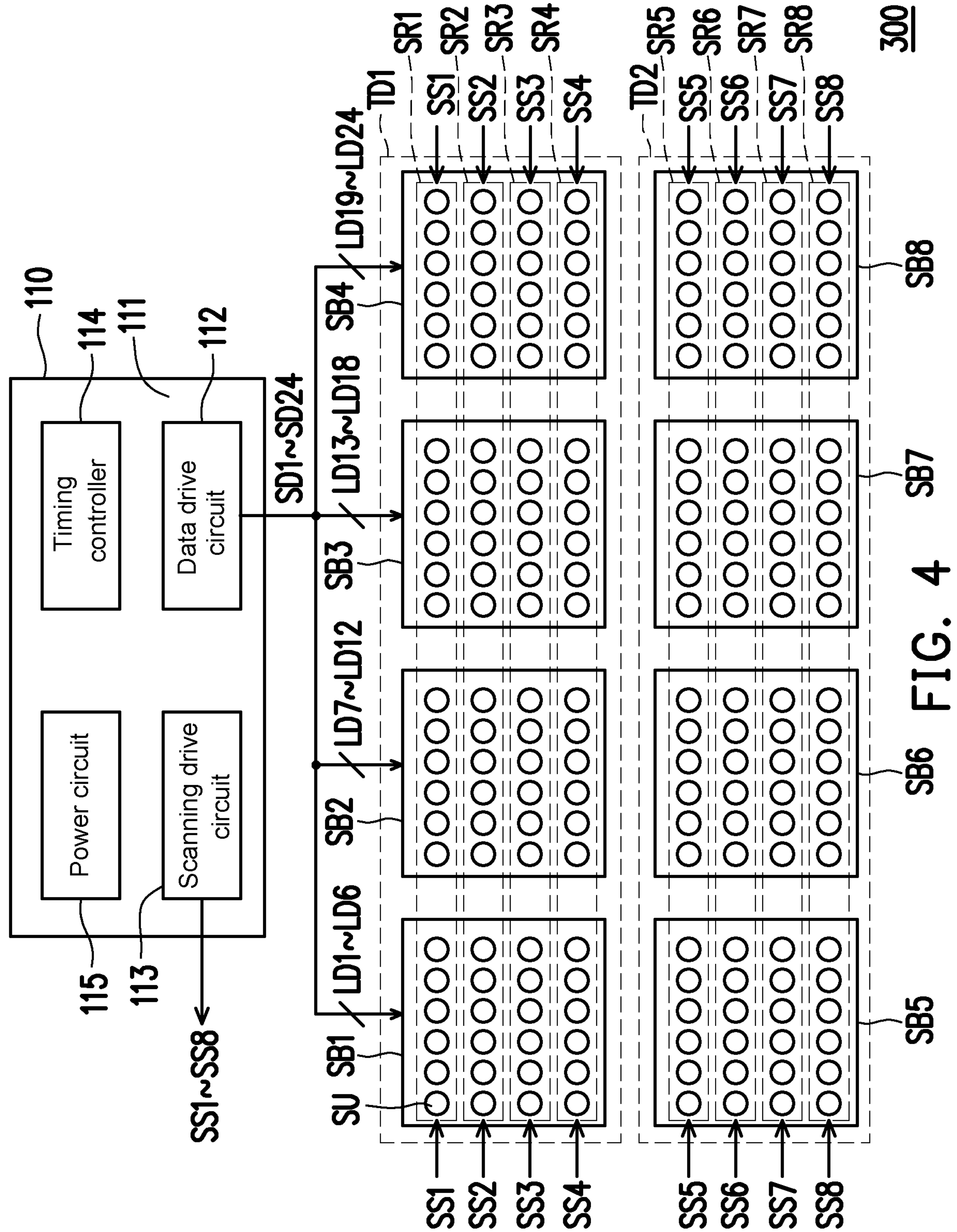
FIG. 4 is a schematic diagram of the second operation of an electronic device shown according to the third embodiment of the disclosure.

Please refer to FIG. 4. FIG. 4 is a schematic diagram of the second operation of an electronic device according to the third embodiment of the disclosure. In the present embodiment, the scanning drive circuit 113 provides the scan signals SS1 to SS4 with different timings. The scanning drive circuit 113 provides the scan signals SS1 to SS8 with different timings, and bidirectionally scans the semiconductor unit rows SR1 to SR8 of the semiconductor unit substrates SB1 to SB8 in a row-by-row manner using the scan signals SS1 to SS8. It should be noted that, in the present embodiment, the scanning drive circuit 113 provides the scan signal SS1 to opposite ends of the semiconductor unit row SR1 in the row direction. The scanning drive circuit 113 provides the scan signal SS1 to opposite ends of the semiconductor unit row SR1 in the row direction, and so on. For example, taking the semiconductor unit row SR1 as an example, the scanning drive circuit 113 provides the scan signal SS1 to opposite ends of the scan line corresponding to the semiconductor unit row SR1 in the row direction.

It should be noted that in case the tiling devices TD1 and TD2 have a large area, the transmission impedance inside the tiling devices TD1 and TD2 is large. This causes transmission delay and fading of the scan signals SS1 to SS8 in the tiling devices TD1 and TD2, thereby increasing the risk of misoperation of the tiling devices TD1 and TD2. It is worth mentioning here that, via the bidirectional scanning of the present embodiment, the transmission delay and fading of the scan signals SS1 to SS8 in the tiling devices TD1 and TD2 may be reduced.

Figure 5:
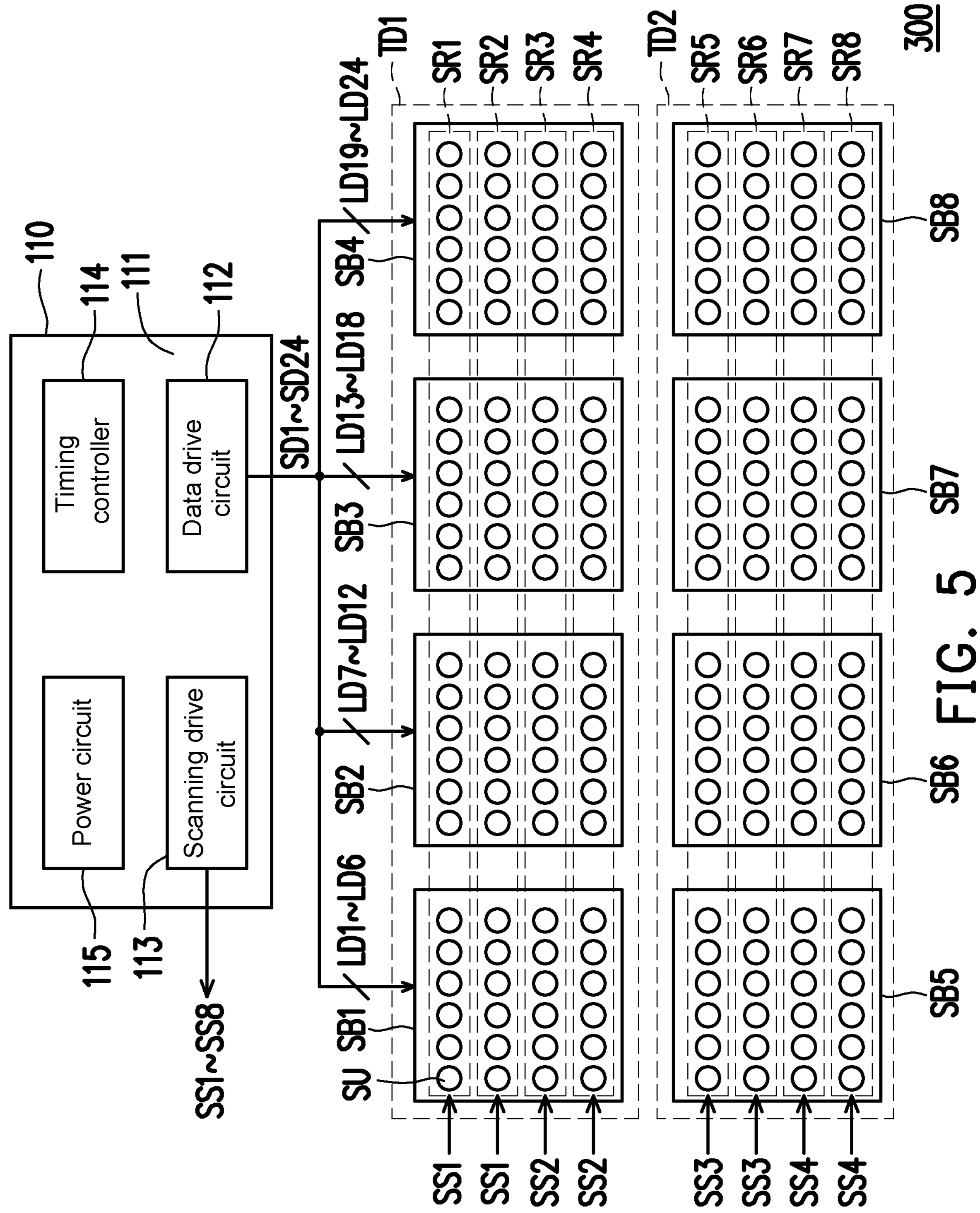
FIG. 5 is a schematic diagram of the third operation of an electronic device shown according to the third embodiment of the disclosure.

Please refer to FIG. 5. FIG. 5 is a schematic diagram of the third operation of an electronic device according to the third embodiment of the disclosure. The scanning drive circuit 113 may simultaneously provide the same at least two sets of scan signals to the semiconductor unit substrates SB1 to SB8. In the present embodiment, the scanning drive circuit 113 provides the scan signal SS1 to the semiconductor unit rows SR1 and SR2. The scanning drive circuit 113 provides the scan signal SS2 to the semiconductor unit rows SR3 and SR4. The scanning drive circuit 113 provides the scan signal SS3 to the semiconductor unit rows SR5 and SR6. Moreover, the scanning drive circuit 113 provides the scan signal SS4 to the semiconductor unit rows SR7 and SR8.

In some embodiments, the scanning drive circuit 113 may provide the scan signal SS1 to the semiconductor unit rows SR1 and SR3, the scanning drive circuit 113 may provide the scan signal SS2 to the semiconductor unit rows SR2 and SR4, the scanning drive circuit 113 may provide the scan signal SS3 to the semiconductor unit rows SR5 and SR7, and the scanning drive circuit 113 may provide the scan signal SS4 to the semiconductor unit rows SR6 and SR8, but the disclosure is not limited thereto.

In some embodiments, the scanning drive circuit 113 bidirectionally scans the semiconductor unit rows SR1 to SR8 of the semiconductor unit substrates SB1 to SB8 in a row-by-row manner using the scan signals SS1 to SS4. Sufficient teaching of the operation of bidirectional scanning may be obtained from the operation of FIG. 4, and is therefore not repeated herein.

Figure 6:
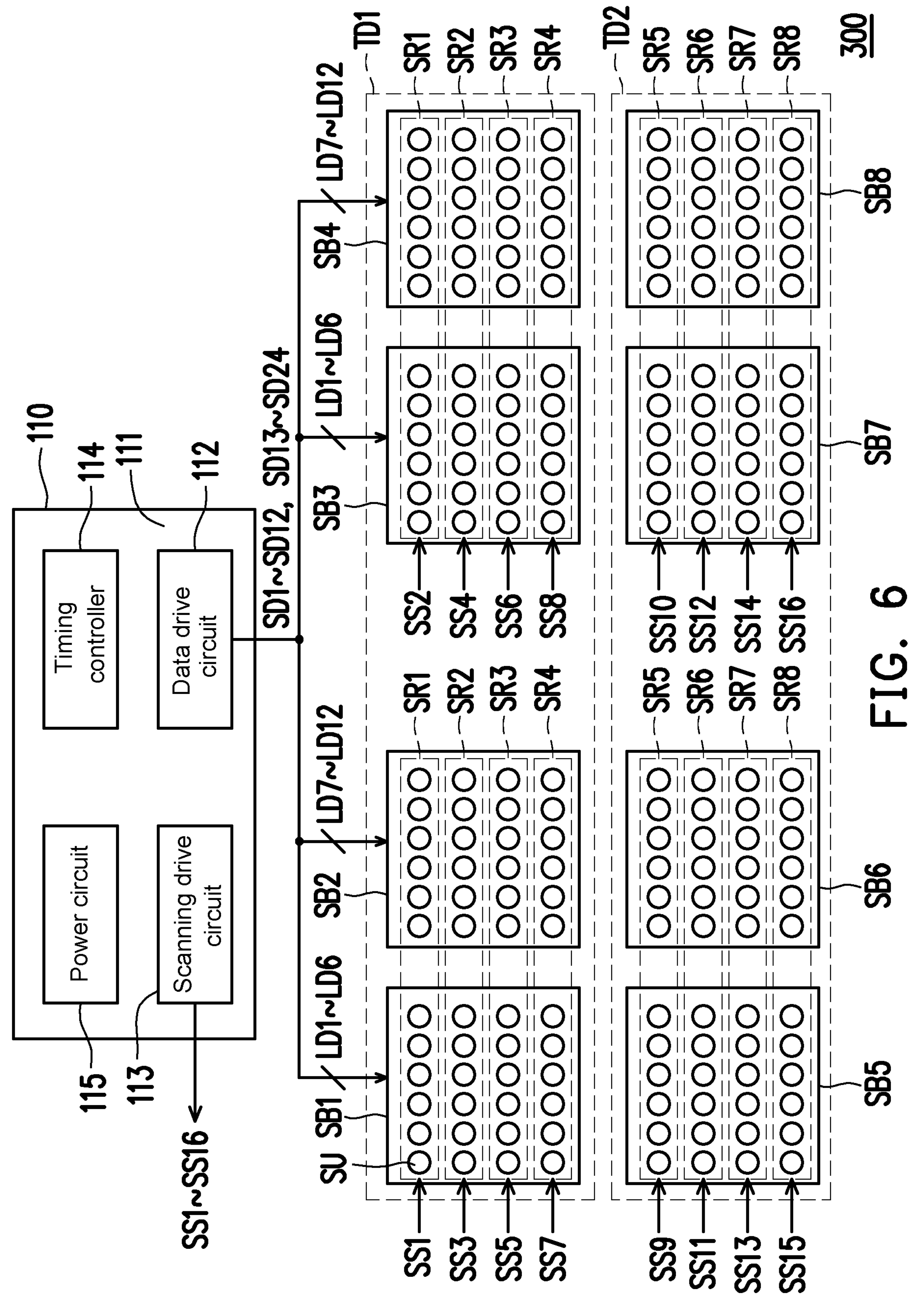
FIG. 6 is a schematic diagram of the fourth operation of an electronic device shown according to the third embodiment of the disclosure.

Please refer to FIG. 6. FIG. 6 is a schematic diagram of the fourth operation of an electronic device according to the third embodiment of the disclosure. In the present embodiment, the scanning drive circuit 113 provides scan signals SS1 to SS16 with different timings. The scanning drive circuit 113 provides the scan signal SS1 to the semiconductor unit row SR1 of the semiconductor unit substrates SB1 and SB2. The scanning drive circuit 113 provides the scan signal SS2 to the semiconductor unit row SR1 of the semiconductor unit substrates SB3 and SB4. The scanning drive circuit 113 provides the scan signal SS3 to the semiconductor unit row SR2 of the semiconductor unit substrates SB1 and SB2. The scanning drive circuit 113 provides the scan signal SS4 to the semiconductor unit row SR2 of the semiconductor unit substrates SB3 and SB4, and so on.

In the present embodiment, the scan signals SS1 and SS2 may provide signals with different timings, and the semiconductor unit row SR1 of the semiconductor unit substrate SB1 and the semiconductor unit row SR1 of the semiconductor unit substrate SB3 do not receive data signals at the same time. Therefore, the semiconductor unit substrates SB1 and SB3 may share the same channels LD1 to LD6. Similarly, the scan signals SS3 and SS4 may provide signals with different timings, and the semiconductor unit row SR2 of the semiconductor unit substrate SB1 and the semiconductor unit row SR2 of the semiconductor unit substrate SB3 do not receive data signals at the same time. Therefore, the semiconductor unit substrate SB1 may share the same channels LD7 to LD12, and so on.

For example, in the first period, the data drive circuit 112 may provide the data signals SD1 to SD6 to the channels LD1 to LD6, and may also provide the data signals SD7 to SD12 to the channels LD7 to LD12. Therefore, the semiconductor unit row SR1 of the semiconductor unit substrates SB1 and SB2 receives the data signals SD1 to SD12 in response to the scan signal SS1. During the first period, the semiconductor unit row SR1 of the semiconductor unit substrates SB3 and SB4 responds to the scan signal SS2, and assuming that the scan signal SS2 is off at this time, the semiconductor unit substrates SB3 and SB4 do not receive the data signals SD1 to SD12. During the second period, the data drive circuit 112 provides the data signals SD13 to SD18 to the channels LD1 to LD6, and provides the data signals SD19 to SD24 to the channels LD7 to LD12. If the semiconductor unit row SR1 of the semiconductor unit substrates SB3 and SB4 responds to the scan signal SS2 during the second period, and assuming that the scan signal SS2 is on at this time, the semiconductor unit substrates SB3 and SB4 receive the data signals SD13 to SD24. The semiconductor unit row SR2 of the semiconductor unit substrates SB1 and SB2 responds to the scan signal SS1 during the second period, and assuming that the scan signal SS1 is off at this time, the semiconductor unit substrates SB1 and SB2 do not receive the data signals SD13 to SD24, and so on.

In the present embodiment, the number of channels LD1 to LD12 may be reduced. Therefore, for a tiling device having more semiconductor unit substrates, the operation mode of the present embodiment may significantly reduce the number of output pins of the data drive circuit 112 configured to provide a data signal, thereby reducing the layout area of the data drive circuit 112.

Figure 7:
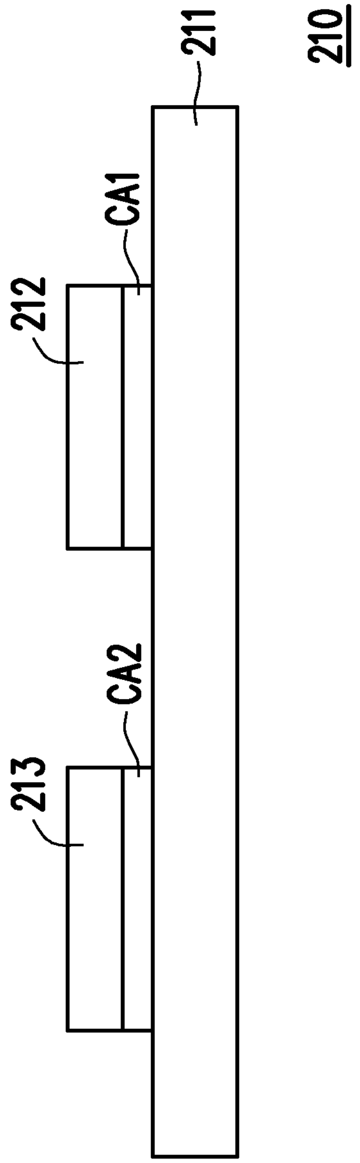
FIG. 7 is a schematic diagram of an integrated driver board shown according to an embodiment of the disclosure.

Referring to FIG. 7, FIG. 7 is a schematic diagram of an integrated driver board shown according to an embodiment of the disclosure. In the present embodiment, an integrated driver board 210 may include a circuit board 211, a data drive circuit 212, a scanning drive circuit 213, and substrates CA1 and CA2. The data drive circuit 212 is disposed on the substrate CAL The scanning drive circuit 213 is disposed on the substrate CA2.

In the present embodiment, the data drive circuit 212 is manufactured on the substrate CA1 during the manufacturing process. After the data drive circuit 212 is manufactured, the data drive circuit 212 and the substrate CA1 are disposed on the circuit board 211. The scanning drive circuit 213 is manufactured on the substrate CA2 during the manufacturing process. After the scanning drive circuit 213 is manufactured, the scanning drive circuit 213 and the substrate CA2 are disposed on the circuit board 211. The substrates CA1 and CA2 may, for example, include a flexible substrate or an inflexible substrate. The material of the substrates CA1 and CA2 may include, for example, glass, ceramic, quartz, sapphire, acrylic, polyimide (PI), polyethylene terephthalate (PET), polycarbonate (PC), other suitable materials, or a combination of the above, but the disclosure is not limited thereto. The substrates CA1 and CA2 may include an electrical connection structure, and the scanning drive circuit 213 and the data drive circuit 212 may be connected to the circuit board 211 via the electrical connection structure. In some embodiments, at least one of the scanning drive circuit 213 and the data drive circuit 212 may be manufactured on the circuit board 211. In some embodiments, at least one of the scanning drive circuit 213 and the data drive circuit 212 may be manufactured on the substrate CA1 and/or the substrate CA2. In some embodiments, one of the scanning drive circuit 213 and the data drive circuit 212 may be manufactured on the substrate CA1 or the substrate CA2 and the other of the scanning drive circuit 213 and the data drive circuit 212 may be manufactured on the circuit board 211.

It may be known from the above that, the number of integrated driver boards, the number of data drive circuits, the number of scanning drive circuits, the number of circuit boards, the number of channels, the number of substrates, and the number of semiconductor unit substrates, and the like, may be designed according to user requirements.

Based on the above, the electronic device may include the integrated driver board and the semiconductor unit substrate. The data drive circuit and the scanning drive circuit may be respectively disposed on the circuit board of the integrated driver board. Therefore, there is no data drive circuit and scanning drive circuit on the at least one semiconductor unit substrate. In this way, the layout area of the semiconductor unit on the at least one semiconductor unit substrate is not occupied by the data drive circuit and the scanning drive circuit. In addition, the electronic device may include the plurality of semiconductor unit substrates. At least one of the data drive circuit and the scanning drive circuit may be not disposed on the plurality of semiconductor unit substrates. The design of the plurality of semiconductor unit substrates may be significantly simplified. Moreover, the plurality of semiconductor unit substrates may be shared by a single data drive circuit and a single scanning drive circuit. The number of data drive circuits and the number of scanning drive circuits are respectively reduced from a plurality to one. In this way, the cost of the electronic device may be significantly reduced.

Lastly, it should be mentioned that: each of the above embodiments is used to describe the technical solutions of the disclosure and is not intended to limit the disclosure; and although the disclosure is described in detail via each of the above embodiments, those having ordinary skill in the art should understand that: modifications may still be made to the technical solutions recited in each of the above embodiments, or portions or all of the technical features thereof may be replaced to achieve the same or similar results; the modifications or replacements do not make the nature of corresponding technical solutions depart from the scope of the technical solutions of each of the embodiments of the disclosure.

What is claimed is:

1. An electronic device, comprising:

an integrated driver board, comprising:

a circuit board;

a data drive circuit disposed on the circuit board; and a scanning drive circuit disposed on the circuit board; and at least one semiconductor unit substrate coupled to the data drive circuit and the scanning drive circuit, wherein the data drive circuit is disposed on a first substrate, the scanning drive circuit is disposed on a second substrate, and the first substrate and the second substrate are disposed on the circuit board.

2. The electronic device of claim 1, wherein the at least one semiconductor unit substrate comprises:

a first semiconductor unit substrate comprising a plurality of first semiconductor units; and a second semiconductor unit substrate comprising a plurality of second semiconductor units, wherein the data drive circuit and the scanning drive circuit are respectively coupled to the first semiconductor unit substrate and the second semiconductor unit substrate.

3. The electronic device of claim 2, wherein:

the scanning drive circuit provides a first scan signal to a first semiconductor unit row in the plurality of first semiconductor units and a first semiconductor unit row in the plurality of second semiconductor units via a first channel during a first period, the scanning drive circuit provides a second scan signal to a second semiconductor unit row in the plurality of first semiconductor units and a second semiconductor unit row in the plurality of second semiconductor units via a second channel during a second period, and a timing of the first scan signal and a timing of the second scan signal are different from each other.

4. The electronic device of claim 3, wherein:

a first semiconductor unit row in the plurality of first semiconductor units and a first semiconductor unit row in the plurality of second semiconductor units receive a data signal during a first period, and a second semiconductor unit row in the plurality of first semiconductor units and a second semiconductor unit row in the plurality of second semiconductor units receive a data signal during a second period.

5. The electronic device of claim 2, wherein:

the scanning drive circuit provides a first scan signal to a first semiconductor unit row in the plurality of first semiconductor units, and the scanning drive circuit provides a second scan signal to a first semiconductor unit row in the plurality of second semiconductor units, and a timing of the first scan signal and a timing of the second scan signal are different from each other.

6. The electronic device of claim 2, wherein the data drive circuit simultaneously outputs a first data signal and a second data signal to the first semiconductor unit substrate and the second semiconductor unit substrate.

7. The electronic device of claim 2, wherein a number of channels output from the data drive circuit to the first semiconductor unit substrate is the same as a number of channels output to the second semiconductor unit substrate.

8. The electronic device of claim 2, wherein the scanning drive circuit simultaneously outputs a first scan signal and a second scan signal to the first semiconductor unit substrate and the second semiconductor unit substrate.

9. The electronic device of claim 2, wherein a number of channels output from the scanning drive circuit to the first semiconductor unit substrate is the same as a number of channels output to the second semiconductor unit substrate.

10. The electronic device of claim 2, wherein a number of channels output from the scanning drive circuit to the first semiconductor unit substrate and the second semiconductor unit substrate is different from a number of channels output from the data drive circuit to the first semiconductor unit substrate and the second semiconductor unit substrate.

11. The electronic device of claim 2, wherein a number of channels output from the scanning drive circuit to the first semiconductor unit substrate and the second semiconductor unit substrate is the same as a number of channels output from the data drive circuit to the first semiconductor unit substrate and the second semiconductor unit substrate.

12. The electronic device of claim 8, wherein the scanning drive circuit simultaneously inputs at least two sets of identical scan signals to the first semiconductor unit substrate and the second semiconductor unit substrate.

13. The electronic device of claim 1, wherein the scanning drive circuit bidirectionally scans a plurality of semiconductor unit rows of the at least one semiconductor unit substrate in a row-by-row manner.

14. The electronic device of claim 13, wherein the scanning drive circuit simultaneously provides a scan signal to opposite ends of a scan line corresponding to one of the plurality of semiconductor unit rows in a row direction.

15. The electronic device of claim 1, wherein:

the at least one semiconductor unit substrate comprises a plurality of semiconductor unit substrates, and the plurality of semiconductor unit substrates are tiled into at least one tiling device.

16. The electronic device of claim 1, wherein the integrated driver board further comprises:

a timing controller disposed on the circuit board and coupled to the data drive circuit and the scanning drive circuit via the circuit board.

17. The electronic device of claim 1, wherein the integrated driver board further comprises:

a power circuit configured to provide a driving power needed by the electronic device during an operation.

18. The electronic device of claim 1, wherein at least one of the data drive circuit and the scanning drive circuit is disposed on a substrate.

* * * * *